Aug. 3, 1965   R. J. WILLIAMS   3,198,163
INDICATOR DEVICE
Filed Feb. 13, 1963
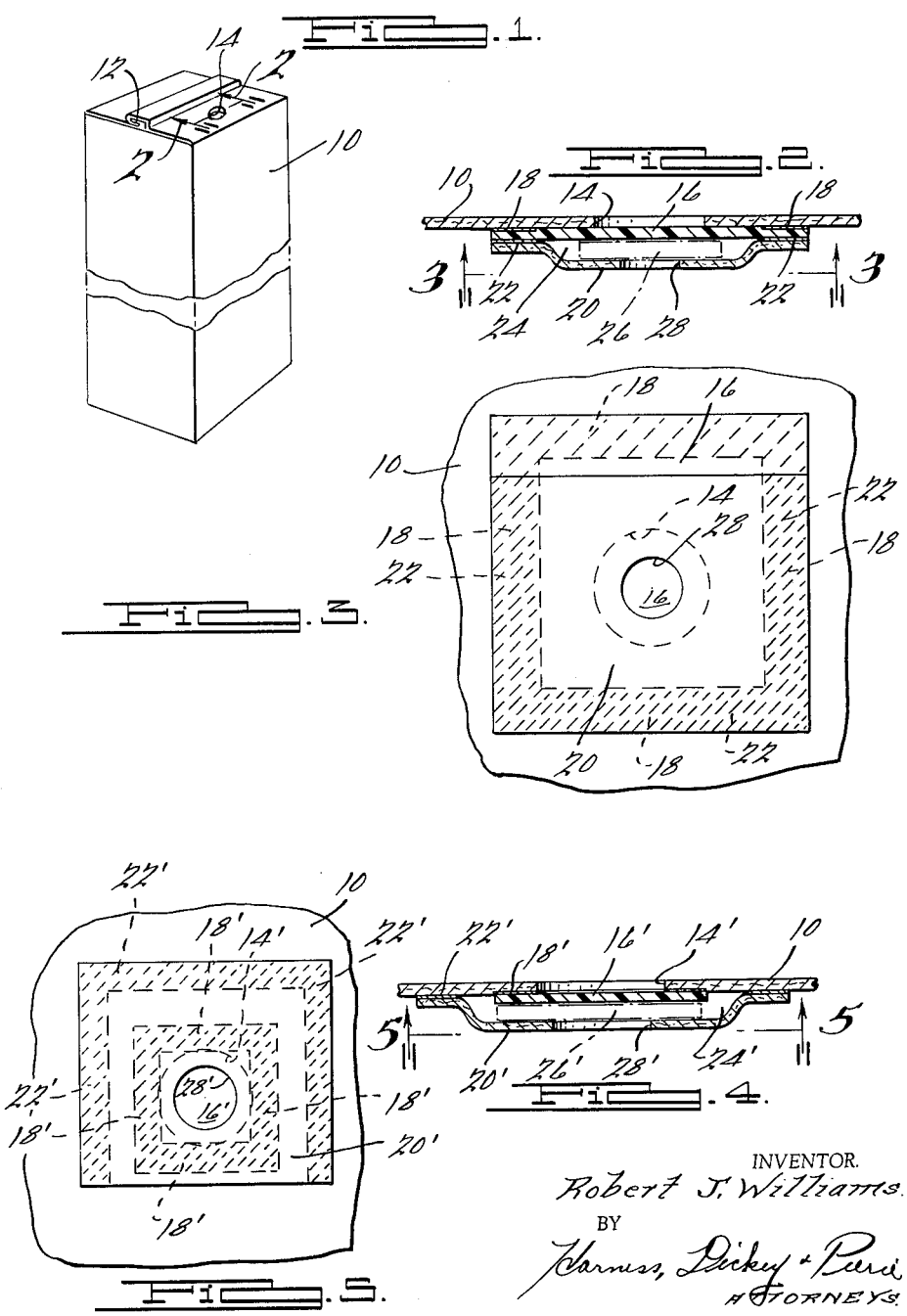
INVENTOR.
Robert J. Williams
BY
Harness, Dickey & Pierce
ATTORNEYS

United States Patent Office 3,198,163
Patented Aug. 3, 1965

3,198,163
INDICATOR DEVICE
Robert J. Williams, Birmingham, Mich., assignor to Cadillac Products, Inc., Warren, Mich., a corporation of Michigan
Filed Feb. 13, 1963, Ser. No. 258,265
11 Claims. (Cl. 116—114)

The present invention relates generally to containers and more particularly to a novel humidity indicator device which may be formed integrally with a humidity-resistant container to indicate when the atmosphere therein reaches an undesirable humidity level.

Although the invention may be used in conjunction with any type of container, whether bag-like, rigid, or flexible, it is preferable that it have a heat sealable thermoplastic inside surface in the region where the humidity indicating device is to be located since the latter is of heat sealable construction and is adapted to be heat sealed to the container.

It is a primary object of the present invention to provide a unique humidity indicating device for use in conjunction with containers having a heat sealable inside surface portion, which device is extremely simple and inexpensive in construction, which is corrosion-proof, which is leakproof, and which provides a visual indication of the humidity within a hermetically sealed container without requiring that the seal be broken.

Another object resides in the provision of a humidity indicator of the aforedescribed type which does not in any way weaken the container on which it is provided, such as might impair its ability to maintain a substantial vacuum therein, and which can be positioned anywhere on the container, wherever it will be most easily visible for inspection.

These and other objects of the present invention will become apparent from consideration of the specification taken in conjunction with the accompanying drawings in which there are illustrated several embodiments of the present invention, by way of example, and wherein:

FIGURE 1 is a perspective view of a container provided with an indicator device embodying the principles of the present invention;

FIGURE 2 is a sectional view taken along line 2—2 in FIGURE 1;

FIGURE 3 is an inside plan view looking along line 3—3 in FIGURE 2;

FIGURE 4 is a view similar to FIGURE 2 illustrating a second embodiment of the present invention; and FIGURE 5 is an inside plan view looking along line 5—5 in FIGURE 4.

Referring in detail to the drawings, a container embodying a preferred embodiment of an indicator device incorporating the principles of the present invention is illustrated in FIGURES 1, 2, and 3, and comprises: a container 10, shown here as being formed of a flexible material, evacuated and fully sealed, as at 12, about an article to be protected; means defining a viewing aperture 14 through which a visual humidity indicating material may be viewed, this aperture positioned at the top of the container so that it may be conveniently viewed in the event the container is itself enclosed by a sturdier carton, crate or tube having a top removable for convenient inspection; a substantially transparent window 16 overlying aperture 14 and heat sealed about its entire periphery, as at 18, to the peripheral portions of the inside of container 10 surrounding aperture 14; and a porous backing member 20 overlying the portion of window 16 which overlies aperture 14 and having three of its four peripheral portions heat sealed to window 16, as at 22, to thereby define a pocket 24 for slidably receiving a suitable humidity indicator, such as that shown in phantom lines at 26. Backing member 20 may be rendered porous in any desired manner, such as by providing it with one or more vent openings 28, one being shown for exemplary purposes. By the term "heat seal" is meant any fusion-type seal.

As best seen in FIGURE 3, a portion of the periphery of window 16 projects from beneath the portion of the periphery of the backing member which is not fused thereto, i.e., from beneath the edge which defines the open side of the pocket. In addition, the remaining portions of the window and backing member are substantialy the same size and shape. Thus, it is possible to heat seal all three elements together simultaneously without sealing pocket 24 closed.

Container 10 may be formed of any suitable material, rigid or flexible, but is preferably such that thermoplastic materials may be heat sealed to it. Thus, if the material used is not itself thermoplastic, or if its heat sealing properties are not sufficiently great, the interior of the container should have laminated thereto or be coated with a thin film of a good heat sealing thermoplastic, such as polyethylene, at least in the regions thereof where the present indicator device is to be positioned. The container material should also, of course, have sufficient strength for the article contained to resist puncturing which might otherwise be caused by normal handling or by the force of atmospheric pressure due to a vacuum therein. In addition, it should have a rate of vapor transmission which is low enough to meet the requirements specified. One material which has been found to be acceptable is a commercially available polyethylene film-aluminum foil-cotton fabric laminate, at least for forming strong, impervious, flexible containers which may be fully heat sealed and evacuated to hermetically seal the article contained therein from the atmosphere.

The material of which window 16 is formed should be relatively transparent and should have a low vapor transmission rate. In addition, it should be relatively strong and heat sealable to the inside surface of the container. It has been found that a number of thermoplastics have these characteristics and are therefore suitable, such as polyethylene, vinyl, Mylar (polyethylene terephthalate) and so on. However, it has also been discovered that the particular advantages of each of these materials may be utilized if the window is formed of Mylar film, which has great strength and a very low rate of vapor transmission, having laminated to each of the surfaces thereof, such as by a suitable adhesive or by an extrusion process, a thin film of polyethylene, which has superior heat sealing properties. Mylar film, so laminated, is commercially available and is believed to be preferable for use as a window material in the present indicator device.

Backing member 20, which is preferably as inexpensive as possible, also may be formed of either a thermoplastic material, such as polyethylene, or a material which is coated with one on the surface to be sealed to the window. It should be porous, such as by providing one or more vent openings therethrough, so that the atmosphere within the container will be assured of reaching the humidity indicator in pocket 24.

Humidity indicator 26 may be of any suitable type, although the present invention is particularly adapted to facilitate the use of the well known commercially available type which is in the form of a chemically treated, impregnated or coated piece of cardboard or the like which visually indicates the presence of excessive humidity or water vapor by changing color. This color change is made visible outside the hermetically sealed container by virtue of the present invention.

In FIGURES 4 and 5 there is illustrated a modified form of the invention in which the same materials are used, except for the window which if not itself thermoplastic requires a thermoplastic film or coating only on the outside surface thereof, and in which the elements corresponding to those in the first embodiment are designated by the same reference numeral primed. The primary difference in the second embodiment is that window 16' is smaller than backing member 20' and thus may be heat sealed to the container in an independent operation. After the window has been sealed in place, backing member 20' can be placed in an overlying position and heat sealed directly to the container about a portion of its periphery. The resulting construction functions in exactly the same manner as the first embodiment, and might be desired when the materials used are not readily adapted to multiple seals or where such seals are not of sufficient strength or tightness.

The present invention is ideally suited for applications where humidity-sensitive articles, such as delicate instruments, chemicals, machinery, and so on, are to be stored for a relatively long duration or are to be transported through intolerably high humidity areas. In such applications the indicator device of the present invention serves to visually indicate when the atmosphere within the container becomes unacceptably high, without requiring that the seal be broken. Consequently when excessive humidity is indicated the article may be re-packaged before it is injured.

Many other modifications, variations and applications are, of course, possible. For example, a visual indicator which is responsive to the presence of a particular undesirable vapor, or to excessively high or low temperature, or pressure, etc., may be used in lieu of or in addition to one responisve to humidity, to provide the same character of protection to the contained article. Also electronic or induction fusion seals may be used in lieu of heat seals.

Thus there is disclosed in the above description and in the drawings an exemplary embodiment of the invention which fully and effectively accomplishes the objects thereof. However, it will be apparent that variations in the details of construction may be indulged in without departing from the sphere of the invention herein described, or the scope of the appended claims.

What is claimed is:

1. An enclosure for humidity sensitive articles, comprising: a container adapted to receive the article to be enclosed; a film of thermoplastic material laminated to a portion of the inside surface of said container; means defining an aperture in said portion of said container; a substantially transparent window having a film of thermoplastic material on both surfaces thereof overlying said aperture and fused about its periphery to the surrounding inside surface of said container; and a porous thermoplastic backing member overlying said aperture and said window, said backing member being fused about a portion only of its periphery to the periphery of said window whereby a pocket is defined between said backing member and said window, a portion of the periphery of said window projecting from beneath the portion of the periphery of the backing member which is not fused thereto so that said container, window and backing member may be fused together in a single operation, said pocket being adapted to receive humidity indicating material so that the latter is visible from outside said container through said window.

2. A device as claimed in claim 1, wherein said window is polyethylene terephthalate and said film material thereon is polyethylene.

3. A device as claimed in claim 1, wherein said container is formed of a laminate of metal foil and woven fabric and said film laminated thereto is polyethylene.

4. A humidity indicating device for a container having thermoplastic on a portion of the inside surface thereof, comprising: means defining an aperture in said portion of said container; a substantially transparent window overlying said aperture and fused about its periphrey to the surrounding inside surface of said container; and a porous thermoplastic backing member overlying said window and fused about a portion only of its periphery to the periphery of said window to define a pocket for receiving and holding humidity indicating material visible from outside said container through said window, a portion of the periphery of said window projecting from beneath the portion of the periphery of the backing member which is not fused thereto so that said container, window and backing member may be fused together in a single operation.

5. A device as claimed in claim 4, wherein said window has a film of thermoplastic material on both surfaces thereof.

6. A device as claimed in claim 5, wherein said window is polyethylene terephthlate and said film material thereon is polyethylene.

7. A humidity indicating device for a container having thermoplastic on a portion of the inside surface thereof, comprising: means defining an aperture in said portion of said container; a substantially transparent window overlying said aperture and fused about its periphery to the surrounding inside surface of said container; and a porous thermoplastic backing member overlying said window and fused about a portion only of its periphery to the periphery of said window to define a pocket for receiving and holding humidity indicating material visible from outside said container through said window.

8. A device as claimed in claim 7, wherein said window has a film of thermoplastic material on both surfaces thereof.

9. A device as claimed in claim 8 wherein said window is polyethylene terephthalate and said film material thereon is polyehtylene.

10. A device as claimed in claim 7, wherein said container is formed of a laminate of metal foil and woven fabric and said film laminated thereto is polyethylene.

11. A humidity indicating device for a container having thermoplastic on a portion of the inside surface thereof, comprising: means defining an aperture in said portion of said container; a substantially transparent window overlying said aperture and fused about its periphery to the surrounding inside surface of said container; and a porous thermoplastic backing member overlying said window and fused about a portion only of its periphery directly to said container to define a pocket for receiving and holding humidity indicating material visible from outside said container through said window.

References Cited by the Examiner

UNITED STATES PATENTS

| | | | |
|---|---|---|---|
| 1,843,234 | 2/32 | Karnes et al. | 73—335 X |
| 2,858,248 | 10/58 | Hastings et al. | 161—220 |
| 2,951,461 | 9/60 | Lockwood | 73—73 X |
| 3,017,302 | 1/62 | Hultkrans. | |
| 3,067,015 | 12/62 | Lawdermilt | 116—114.20 |
| 3,073,434 | 1/63 | Fink | 206—45.34 |

ISAAC LISANN, *Primary Examiner.*